(No Model.)

W. PULVER.
DITCHING MACHINE.

No. 312,758. Patented Feb. 24, 1885.

Witnesses,
E. Horton
Charles J. Hoyt

Inventor,
William Pulver
Per E. Horton
Attorney.

UNITED STATES PATENT OFFICE.

WILLIAM PULVER, OF ITALY HILL, NEW YORK.

DITCHING-MACHINE.

SPECIFICATION forming part of Letters Patent No. 312,758, dated February 24, 1885.

Application filed May 26, 1884. (No model.)

*To all whom it may concern:*

Be it known that I, WILLIAM PULVER, a citizen of the United States, residing at Italy Hill, in the county of Yates and State of New York, have invented Improvements in Ditching-Plows, of which the following is a specification.

This invention has relation to agricultural ditching-machines drawn by horse-power; and it consists in the construction and novel arrangement of parts, as hereinafter shown, described, and set forth in the claims.

Figure 1:
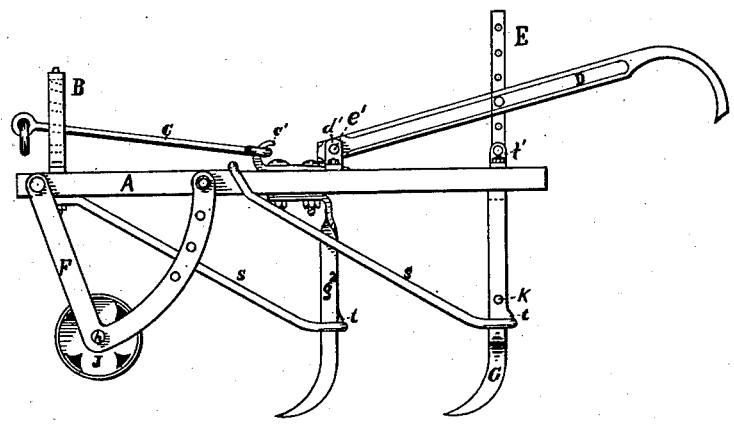
Figure 2:
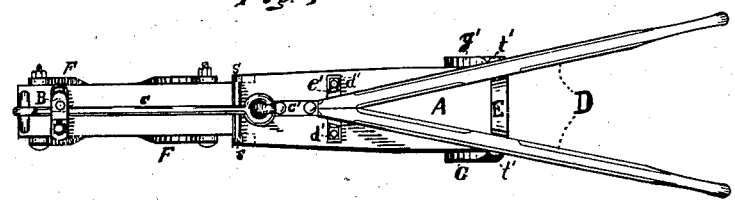
Figure 3:
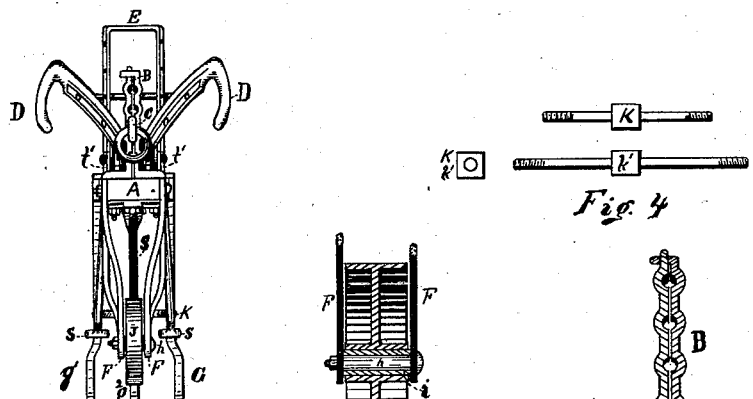
Figure 5:
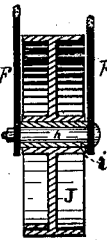
Figure 6:
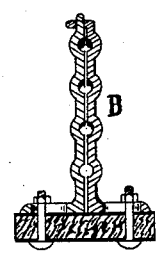

In the accompanying drawings, Figure 1 is a side elevation of my improved ditcher. Fig. 2 is a plan view of same. Fig. 3 is a front end view of same. Fig. 4 shows side and end views in detail of cross-bar for adjusting the rear teeth sidewise. Fig. 5 is a sectional view in detail of wheel and its bearings. Fig. 6 is a vertical sectional view in detail of the draw-bar standard.

Similar letters refer to similar parts.

A represents the main frame, to which all other parts are directly or indirectly attached in the following manner: Near the forward end is bolted the standard B, made of two pieces, having their attaching ends turned outward at right angles and slotted for adjustment to and from each other, while their upper ends are hinged together by the rounded end of one passing through a hole in the end which is bent to overcap the other. There is a series of holes, the half part of which is cut in the inner edge of each piece, and through which the draw-bar C, for vertical adjustment, may be passed and clamped. Said draw-bar is pivoted to a hook, C', bolted upon and near the center of said frame A, and in close proximity thereto are also bolted two angular ears, d', between which the handles D are pivoted upon the bolt e', passing through them. Vertical adjustment of said handles is secured by proper connection with a swinging standard, E, bent in U form, having holes through its sides and in position reverted with ends downward and pivoted to other similar angular ears, f', also bolted upon the rear end of said frame A. Underneath, and secured by the same bolts which hold the ears f' in place, are two like teeth, G and g', while a similar third tooth, g², is secured centrally to the frame by the bolts which hold the hook C' in place. These teeth I make of strap-steel, and sharpen them edgewise in a curve best suited to penetrate the soil.

To the forward end of frame A by a cross-bolt are pivoted the arms F. Said arms in form are alike, and consist of a straight bar and circle, at the junction of which they are bolted together by a bolt, h, passing through them and a hollow shaft, i, which is a trifle longer than the hub of the wheel J, journaled upon it. A series of holes are formed through the circle portion of said arms, through which and the frame a bolt passes and governs vertical adjustment of the wheel J.

In gaging the width of ditch to be cut it is necessary that the teeth G and g' should have lateral adjustment to and from each other, which I accomplish by a series of cross-bars, K and k', of different lengths, having right and left hand threads cut at their ends and squared in their centers for applying a wrench, and that the rear draw-braces, S S, clasping said teeth, shall not interfere with such adjustment I loop them staple-fashion over and forward of shoulders of the frame A.

To prevent the braces from slipping upward on the teeth, I make the projections t.

Having thus fully described my improvements, what I claim, and wish to secure by Letters Patent, is—

1. In a single-bar frame ditching-plow, a standard, B, composed of two similar parts hinged together at their upper ends having corresponding indentures and horizontally-slotted attaching ends, the whole arranged to be supported and clamp a draw-bar, C, within the indentures by means of vertical bolts passing through the slots and frame A in the manner substantially as shown and described.

2. In a single-bar frame ditching-plow, the standard B, made of two similar parts hinged together at their upper ends, each having circular indentures in them, and horizontally-slotted attaching ends, in combination with the frame A, the teeth, and the adjustable gage-wheel, substantially as shown and described.

WILLIAM PULVER.

Witnesses:
E. HORTON,
CHARLES S. HOYT.